Figure 8:
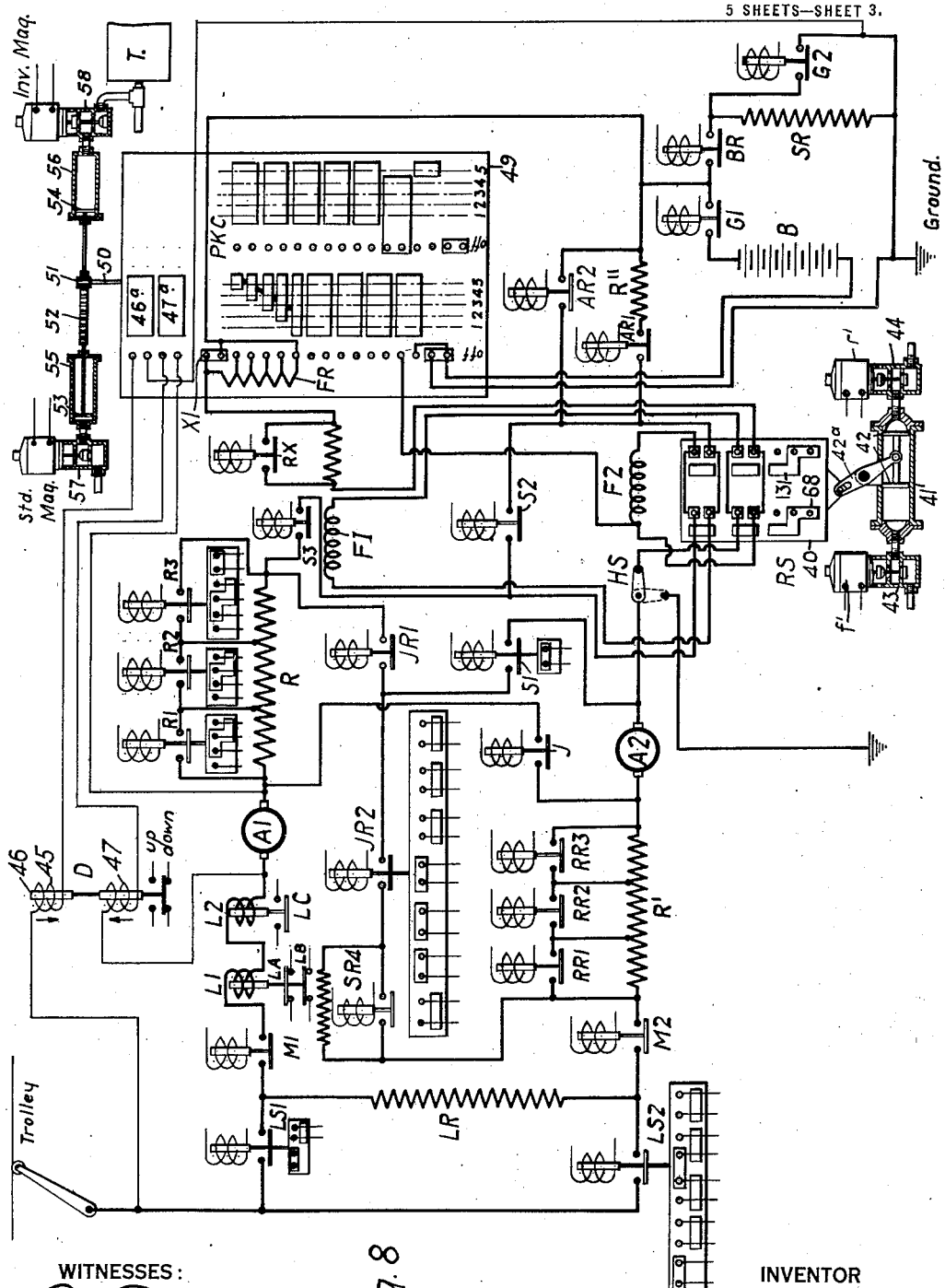

N. W. STORER.
CONTROL SYSTEM.
APPLICATION FILED APR. 23, 1915.
1,298,818.
Patented Apr. 1, 1919.
5 SHEETS—SHEET 1.
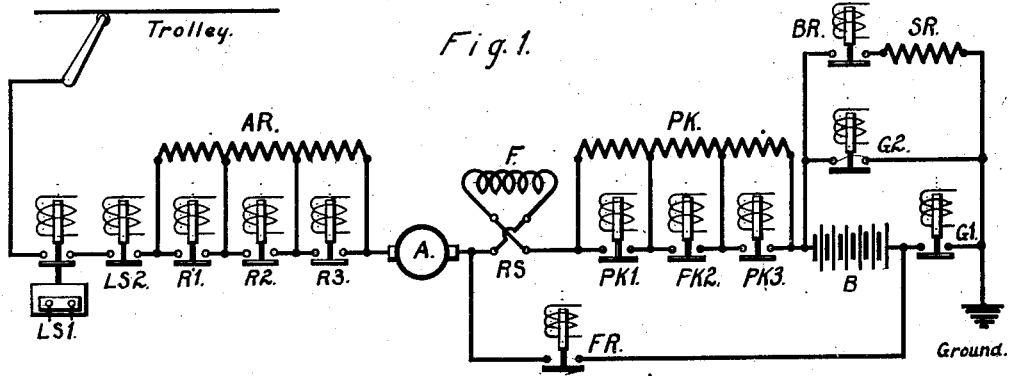
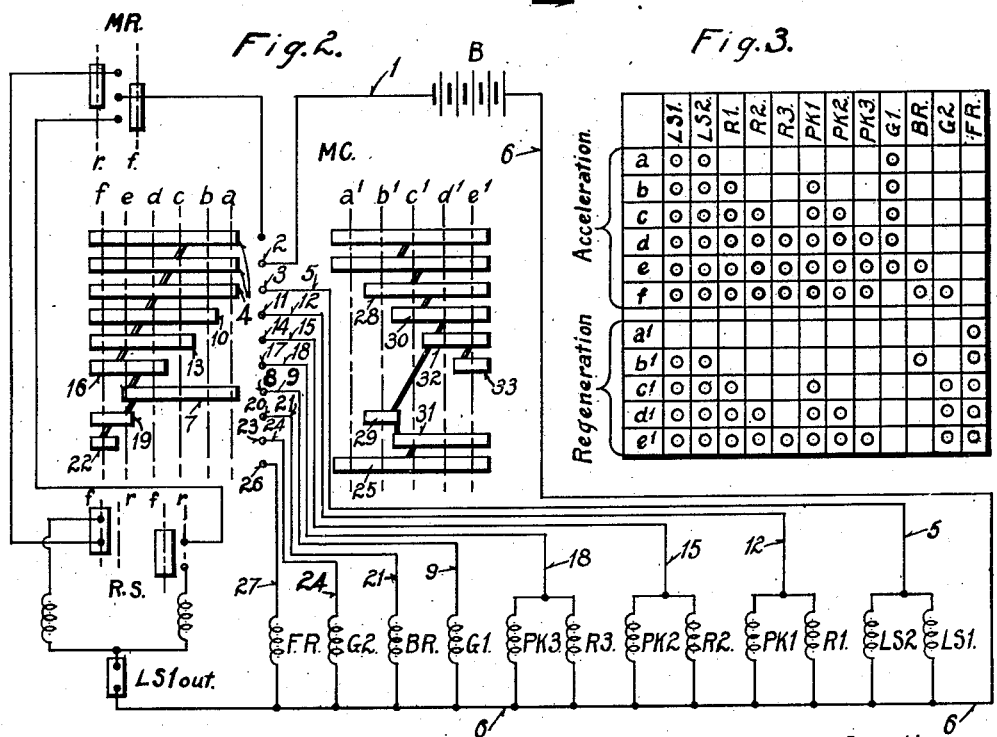
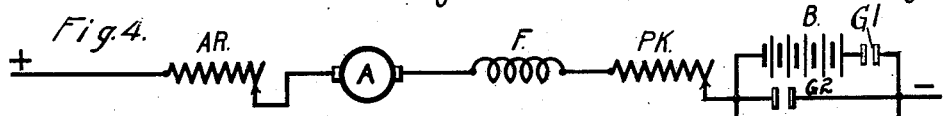
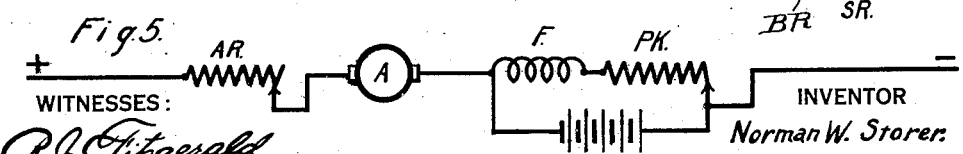
WITNESSES:
R. J. Fitzgerald
W. H. Coley
INVENTOR
Norman W. Storer.
BY
Chesley G. Carr
ATTORNEY N. W. STORER.
CONTROL SYSTEM.
APPLICATION FILED APR. 23, 1915.
1,298,818.
Patented Apr. 1, 1919.
5 SHEETS—SHEET 2.
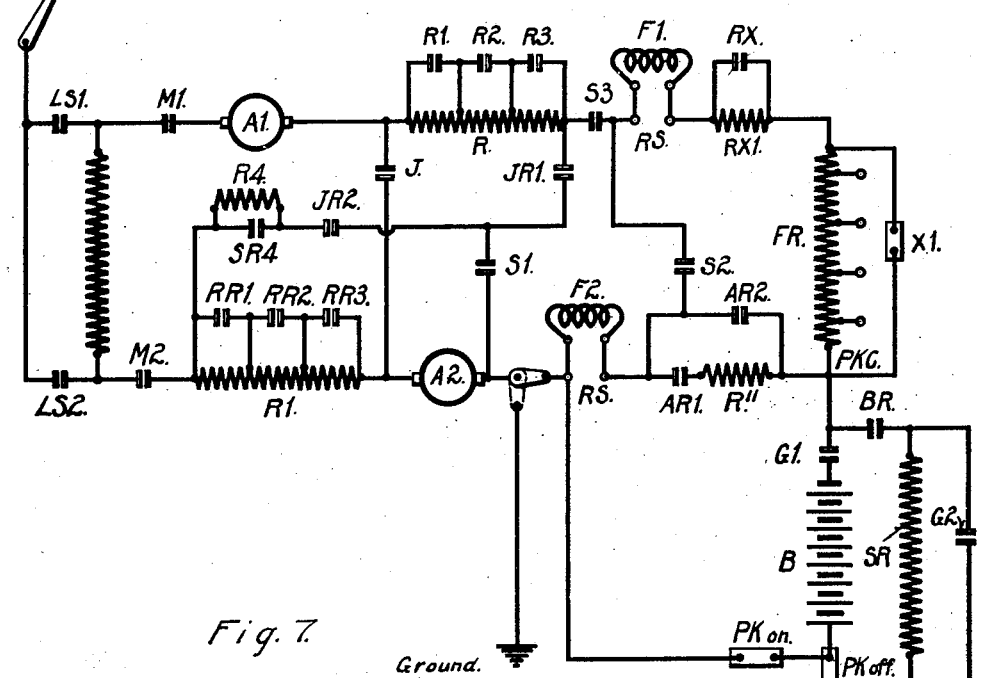

N. W. STORER.
CONTROL SYSTEM.
APPLICATION FILED APR. 23, 1915.

1,298,818.

Patented Apr. 1, 1919.
5 SHEETS—SHEET 4.

WITNESSES:

INVENTOR
Norman W. Storer.
BY
ATTORNEY

N. W. STORER.
CONTROL SYSTEM.
APPLICATION FILED APR. 23, 1915.
1,298,818.
Patented Apr. 1, 1919.
5 SHEETS—SHEET 5.
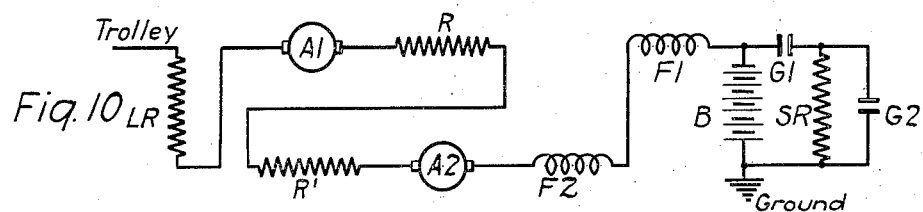
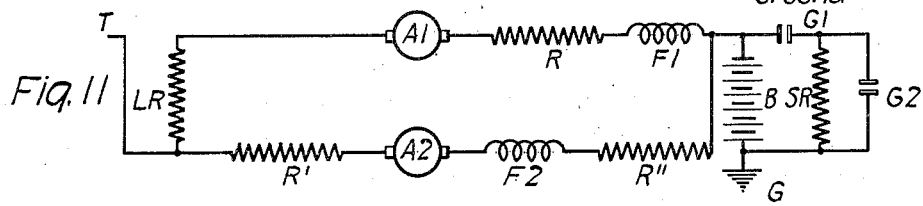
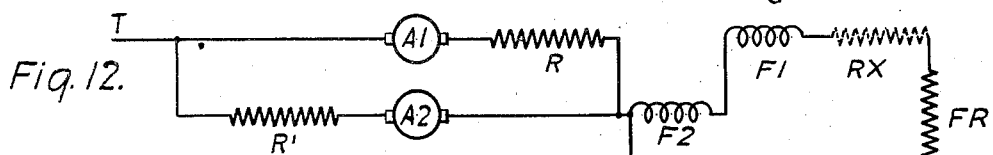
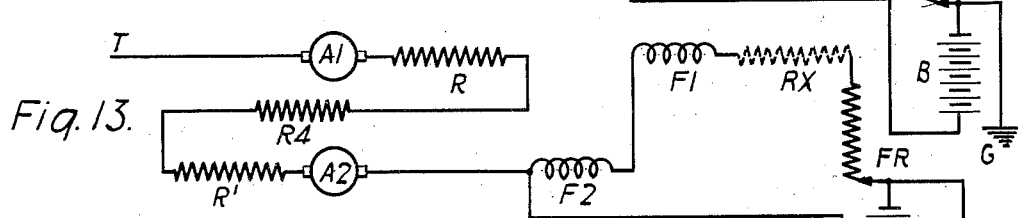
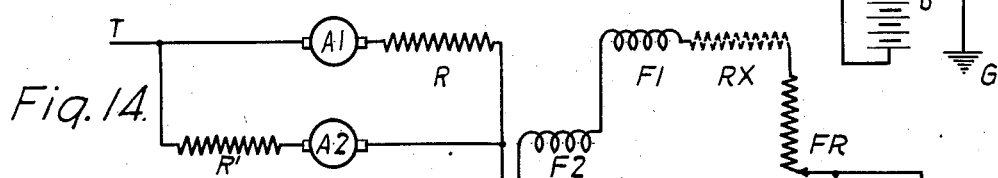
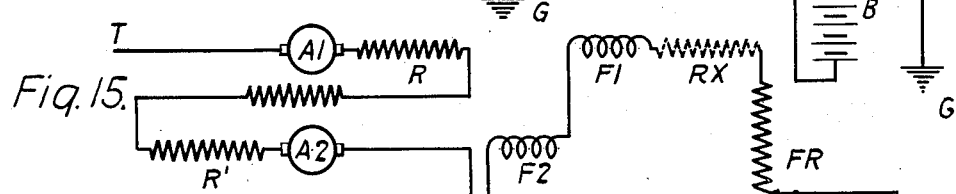
WITNESSES:
R. J. Ridge.
W. R. Coley
INVENTOR
Norman W. Storer.
BY
Wesley G. Carr
ATTORNEY

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,298,818.     Specification of Letters Patent.     Patented Apr. 1, 1919.

Application filed April 23, 1915. Serial No. 23,413.

*To all whom it may concern:*

Be it known that I, NORMAN W. STORER, a citizen of the United States, and a resident of Pittsburgh, in the county of Allegheny and State of Pennsylvania, have invented a new and useful Improvement in Control Systems, of which the following is a specification.

My invention relates to systems of control and it has special reference to the control of electric railway motors that are adapted for regenerative connection to the supply circuit.

One object of my invention is to provide a simple, inexpensive and convenient system of the above-indicated character which shall require relatively infrequent inspection or maintenance work.

In the system set forth in my co-pending application, Serial No. 724,068, filed October 5, 1912, is shown a storage battery which is employed for exciting the motor-field winding during regenerative operation, but which is not used in any way at other times, and, consequently, in some cases is liable to become unduly discharged and to require special connections for recharging. Moreover, in various other systems of the prior art, the same conditions obtain.

According to my present invention, therefore, I provide a system of vehicle-motor control that is adapted for regenerative connection to the supply circuit with a battery connected to energize the field winding of the motor. The same battery is employed during acceleration in the same manner as a step of resistance, being so connected in circuit, at starting, as to be charged by the motor current, and being subsequently excluded from circuit to cause acceleration of the motor. Thus, the battery is always maintained in a well-charged state and the cost and weight of an additional accelerating resistor are obviated.

Another object of my invention is to provide a system of the above-indicated character wherein, during both the accelerating period when "series-parallel" operation is employed and during the regenerative period when "parallel-series" operation is used, all of the field-magnet windings of the machine shall remain on the negative or ground side of all of the armatures, which system of connections is particularly desirable in relatively high-voltage systems.

Figure 9:
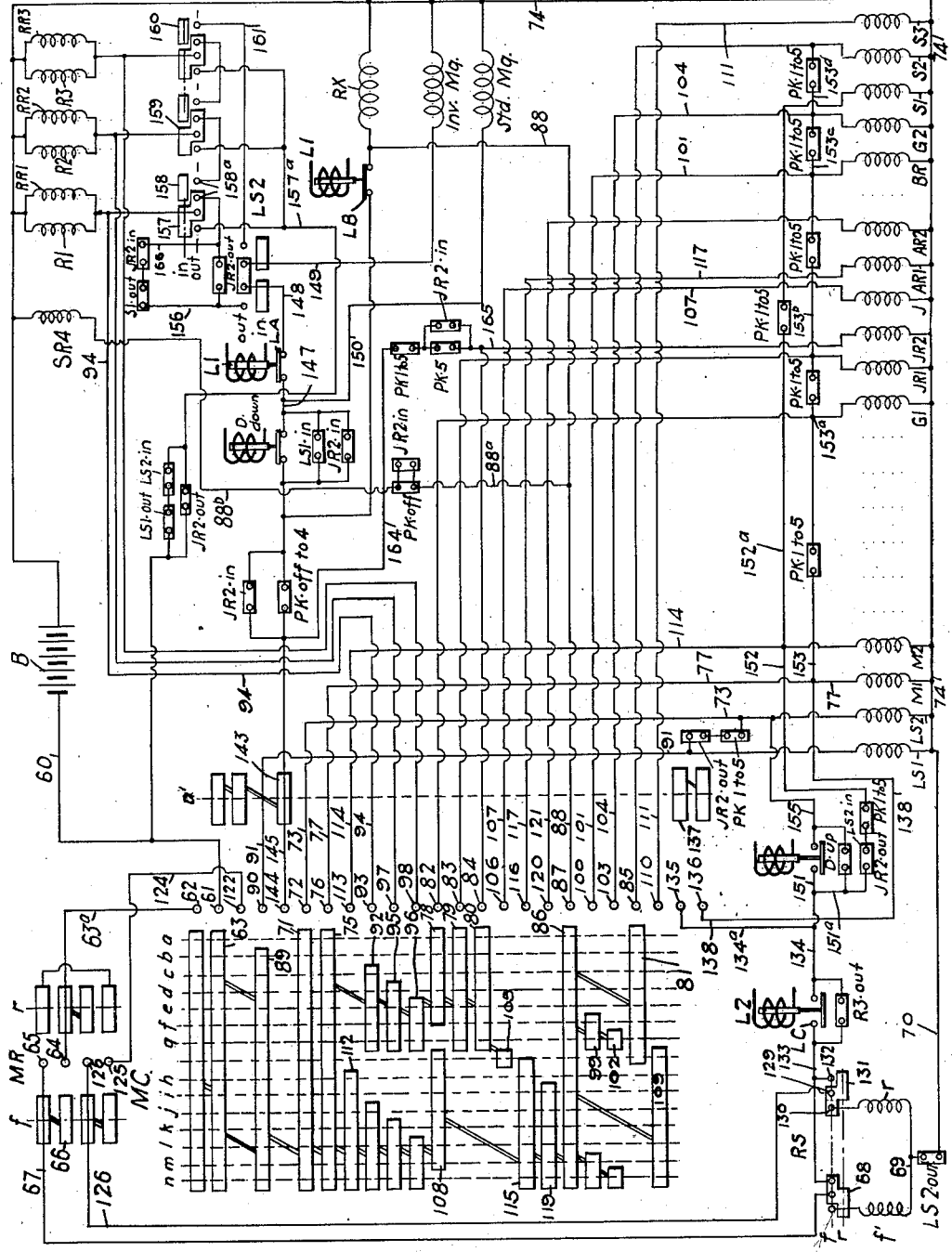

In the accompanying drawings, Figure 1 is a diagrammatic view of the main circuits of a relatively simple system of control embodying my invention, Fig. 2 is a diagrammatic view of an auxiliary control system for manipulating the system shown in Fig. 1 in accordance with the sequence chart of well-known form that is illustrated in Fig. 3; Figs. 4 and 5 are simplified diagrammatic views of certain of the main-circuit connections that are employed during acceleration and regeneration, respectively; Fig. 6 is a simplified diagrammatic view, corresponding to Fig. 8; Figs. 7, 8 and 9 are views, respectively corresponding to Figs. 3, 1 and 2, of a different type of control system, namely, a series-parallel system, that embodies my invention; and Figs. 10 to 15, inclusive, are simplified diagrammatic views of various sets of main-circuit connections that are employed during the operation of the system that is shown in Fig. 8.

Referring to Fig. 1 of the drawing, the system here shown comprises a suitable supply circuit including conductors respectively marked "Trolley" and "Ground"; an electric motor having an armature A, a series-connected field magnet winding F, a reversing switch RS of familiar form, for reversing the electrical relations of the armature and field winding of the motor; an accelerating resistor AR, the sections of which are respectively adapted to be short-circuited by switches R1, R2 and R3 that are preferably of a well-known electromagnetically-controlled type; a storage battery B that is preferably connected on the negative or ground side of the motor for the purpose of preventing the impression of a relatively high voltage thereon; a second resistor PK is used for accelerating purposes and also for field regulation during regeneration and the sections of which are respectively adapted to be short-circuited by switches PK1, PK2 and PK3; an auxiliary transition resistor SR; a plurality of line switches LS1 and LS2; a plurality of battery-controlling switches BR and G2 that are used during both acceleration and regeneration; a switch G1 that is employed for accelerating purposes only, and a switch FR that is used during regeneration only. If desired, a counter-electromotive-force battery may be connected from the positive side of the storage battery to the negative conductor to prevent excessive charging, for example, as shown in my co-pending application, Serial No. 781,742, filed July 29, 1913, and as illustrated in Fig. 6.

Reference may now be had to Fig. 2, wherein is shown, in addition to the various actuating coils for the motor-controlling switches shown in Fig. 1, a master controller MC, of a familiar type, for suitably energizing the actuating coils, preferably from the battery B, in accordance with the sequence chart of Fig. 3, the controller being adapted to assume a plurality of motor-accelerating positions $a$ to $f$, inclusive, when operated in one direction, and a plurality of positions $a'$ to $c'$, inclusive, which corresponds to regenerative operation, when the controller is moved in the opposite direction; and a master reverser MR which is electrically associated with the main-circuit reverser RS in a well-known manner. It will be appreciated that, if desired, the battery B may also be employed for operating various auxiliary translating devices, such as car lights and a compressor motor, as well as the auxiliary control system, as also disclosed in my second above-identified co-pending application.

Assuming the master reverser to be moved to its forward position $f$ and the master controller to be moved to its first operating position $a$, the operation of the system may be described as follows: An auxiliary circuit is first established from one side of the storage battery B through conductor 1, control fingers 2 and 3, which are bridged by a contact segment 4 of the master controller, conductor 5, and the actuating coils of the switches LS1 and LS2 to the negative conductor 6 and to the opposite side of the battery B. Another circuit is simultaneously established from an energized contact segment 7 of the master controller, through control finger 8, conductor 9, and the actuating coils of the switch G1 to the negative conductor 6.

The main-circuit connections at this time include all the sections of the accelerating resistors AR and PK, the battery B, and the armature and field winding of the main motor.

For further acceleration of the motor, the master controller MC is moved to its second position $b$, whereupon the energized contact segment 10 engages a control finger 11, from which point a circuit is completed through conductor 12 and the actuating coils of the switches R1 and PK1 to the conductor 6.

In position $c$ of the master controller, an energized contact segment 13 makes contact with a control finger 14, whence a circuit is established through conductor 15 and the actuating coils of the switches R2 and PK2 to the negative conductor 6.

When the master controller occupies its position $d$, a circuit is completed from an energized contact segment 16, through control finger 17, conductor 18, and the negative battery terminal.

As the master controller reaches its next accelerating position $e$, a contact segment 19 engages a control finger 20, from which point a circuit is established through conductor 21 and the actuating coil of the switch BR to the conductor 6, thereby causing the resistor SR to be temporarily shunted around the battery B for the purpose of effecting a smooth transition. The switch G1 is then opened by reason of the disengagement of the control finger 8 from the contact segment 7, and, finally, an energized contact segment 22 makes contact with a control finger 23, as soon as the master controller occupies its final position $f$, from which point a circuit is completed through conductor 24 and the actuating coil of the switch G2 to the conductor 6, thereby effecting a short-circuit of the resistor SR.

The motor is then connected directly across the supply circuit, with both the accelerating resistors AR and PK and the battery B excluded from circuit. The initial main-circuit connections are illustrated in Fig. 4, the arrow-headed lines that are associated with the resistors AR and PK denoting the adaptability of these translating devices to be excluded from circuit in the manner hereinbefore pointed out.

The battery B is thus connected in series circuit with the accelerating motor in such a direction as to be charged by the motor current during a predetermined period of motor acceleration, and is thereby maintained in a well-charged state in order to effectively perform its intended function during regenerative operation, as hereinafter described.

Assuming that the motor is operating at a predetermined speed which is suitable for regeneration, the master controller MC may be moved to its preliminary regenerative position, $a'$, whereupon the reversing switch RS may be operated to its reversed position, for a well-known purpose.

An energized contact segment 25 of the master controller then engages a control finger 26, from which point a circuit is established through conductor 27 and the actuating coil of the switch FR to the negative conductor 6.

The battery B is thus connected in parallel relation to the field winding F and the field regulating resistor PK, and the accelerating resistor AR is also included in the main circuit, as indicated in Fig. 5, although the regenerative circuit is not completed until the main-circuit switches LS1, LS2 and BR are closed, as described below. The actuating coils of the switches LS1 and LS2 are energized by the engagement of the corresponding control finger 3 with an energized contact segment 28, and the coil of the switch BR is energized through a contact segment 29 and the control finger 20, when the master controller is moved to its initial regenerative position $b'$, which movement should be effected when the separate field excitation has caused the generated armature voltage to exceed the supply-circuit voltage by any suitable value, as will be understood.

If the master controller is moved to its third position $c'$, energized contact segments 30 and 31 respectively engage control fingers 11 and 23 to effect energization of the actuating coils of the switches PK1 and R1, and of the switch G2, respectively. The switch BR may then be opened by the disengagement of the contact segment 29 and the control finger 20. If the master controller is moved to its fourth position $d'$, an energized contact segment 32 engages control finger 14 to effect the closure of the switches PK2 and R2. When the master controller is moved to its final regenerative position $e'$, an energized contact segment 33 makes contact with the control finger 17, from which point the actuating coils of the switches PK3 and R3 are energized to effect the closure of those switches.

In this way, the accelerating resistor AR and the field-regulating resistor PK may be gradually excluded from circuit, as the motor speed decreases, to effect a suitable energization of the field winding F, in the latter case, and to maintain a substantially constant regenerated current, as will be understood.

It will be appreciated that, in case a voltage materially higher than supply-circuit voltage is desired during regeneration, the storage battery may be connected as a booster in series relation with the motor.

Reference may now be had to the remaining figures of the drawings, which disclose the application of my invention to the well-known "bridging" type of series-parallel control. Referring particularly to the simplified diagram, Fig. 6, and to the corresponding complete main-circuit diagram, Fig. 8, the system shown comprises a suitable supply-circuit conductor marked "Trolley"; a return-circuit conductor marked "Ground"; a plurality of electric motors having armatures A1 and A2 and series-connected field-magnet windings F1 and F2, respectively; a main-circuit resistor R, the various sections of which are respectively adapted to be short-circuited by switches R1, R2 and R3; a second main-circuit resistor R', the various sections of which are adapted to be short-circuited by switches RR1, RR2 and RR3; a plurality of other main-circuit resistors LR, RX', R4 and R'', the function of which will be set forth more fully later; a reversing switch RS for reversing the electrical relations of the corresponding armatures and field windings; a storage battery B that is adapted to be employed during both acceleration and regeneration, in a manner to be described; a resistor SR that is adapted to be temporarily connected across the battery B during a certain period of acceleration; a field-regulating resistor FR that is employed to vary the field excitation during regeneration; an electrically-controlled, pneumatically-operated controller apparatus PKC for manipulating the field resistor FR in accordance with predetermined conditions; a differential relay switch D that is adapted to automatically inaugurate regeneration under predetermined conditions of supply-circuit voltage and driving-motor voltage; a manually operated switch HS, the position of which determines whether the regenerating motors shall be partially self-excited or separately excited, as hereinafter more fully set forth; a plurality of main-circuit switches LS1, LS2, M1, M2, J, JR1, JR2, SR4, S1, S2, S3, AR1, AR2, G1 and G2; a low-current limit-switch L1 having engaging stationary and movable contact members LA and LB, when occupying its lower position; and a high-current limit-switch L2 having engaging contact members LC, when occupying its upper position, these limit-switches being used during regeneration only, in the system illustrated.

A plurality of auxiliary-circuit interlocks, the interconnections of which are shown in Fig. 9, are illustrated as associated with various main-circuit switches, and each is adapted to be operated by the corresponding switch to an open and a closed position, in accordance with familiar practice.

The reversing switch RS is of the familiar drum type and is preferably adapted to be electrically-controlled and pneumatically-operated. The switch may comprise a suitable contact-segment-carrying drum 40, and an operating mechanism therefor comprising a suitable cylinder 41, a duplex piston 42 operating therein and connected to the drum 40 by a suitable lever 42ª, and a plurality of valves 43 and 44 for admitting fluid pressure from a reservoir or tank T to the cylinder 41 to actuate the piston 42 in the one or the other direction. The operation of the valves 43 and 44 is governed by a pair of corresponding magnets $f'$, $r'$. The differential relay switch D comprises a core member 45 that is adapted to be actuated in a downward direction by a coil 46 that is connected through a contact member 46ª of the apparatus PKC between the conductors "Trolley" and "Ground"; and a second coil 47 that is adapted to actuate the core 45 in an upward direction, being connected through a contact member 47ª of the apparatus PKC across the armature A1. The differential relay switch is adapted to effect the closure of the line switches LS1 and LS2 at the beginning of regenerative operation when the generated voltage of the motor armatures exceeds the supply-circuit voltage by a predetermined amount, as set forth more fully later.

The apparatus PKC comprises, preferably, a drum member 49 that embodies suitable contact members for effecting gradual insertion in, or removal from, the field circuit of the resistor FR; and a plurality of interlocking contact members that are connected in the auxiliary circuits shown in Fig. 9. An operating mechanism for the drum 49 comprises a shaft 50 that is secured thereto and, to the upper end of which, a pinion 51 is rigidly attached. A rack member 52 is adapted to mesh with the pinion 51, and the ends of the rack are provided with suitable pistons 53 and 54 that respectively operate within suitable cylinders 55 and 56. A magnet valve 57, hereinafter termed "standard" magnet valve, is adapted to admit fluid pressure from the tank T to the cylinder 55 when its actuating coil is energized; while a magnet valve 58, hereinafter termed "inverted" magnet valve, is adapted to admit fluid pressure to the cylinder 56 only when deënergized.

Assuming the apparatus PKC to occupy the off position shown, the operation thereof may be briefly described as follows: By energizing both the standard and inverted magnets, fluid pressure is admitted to the cylinder 55 and simultaneously is exhausted from the cylinder 56, whereby the drum 49 is actuated to its various operative positions. By deënergizing the inverted magnet at any time, a condition of balanced pressures on the pistons 53 and 54 obtains, and the drum 49 is immediately brought to rest in the desired position. Upon deënergization of both magnets, fluid pressure is allowed to enter the cylinder 56 and is simultaneously exhausted from the cylinder 55, whereby the drum 49 is returned to the "off" position shown in the drawing.

The auxiliary control system illustrated in Fig. 9 comprises, in addition to the various actuating coils of the switches shown in Fig. 8 and the corresponding interlocks, a master controller MC that is adapted, when actuated in one direction, to occupy a plurality of positions $a$ to $n$, inclusive, corresponding to manual acceleration of the motors, and is adapted to occupy a single position $a'$, when actuated in the other direction, to effect automatic regeneration of the momentum-driven motors; a master reverser MR that is adapted to occupy a forward and a reverse operative position; and the battery B or other suitable source of energy for the various actuating coils.

It will be observed that the actuating coil of the switch RX is connected through coöperating contact members LB of the limit switch L1 in its lower position. The switch RX is thus, during regeneration, adapted to short-circuit the resistor RX' under relatively low-current conditions, but is adapted to effect the insertion of the resistor RX' in the field-magnet circuit when the regenerated current attains a predetermined relatively high value. The resistor RX' thus works, in conjunction with the field-regulating resistor FR, to maintain a substantially constant regenerated current during the regenerative braking operation of the motors.

Assuming the reversing switch RS to occupy its reversed position, the master controller to be moved to its first operative position $a$, and the master reverser to be actuated to its forward position, the operation of the auxiliary control system illustrated may be described as follows: A circuit is first established from one terminal of the battery B through conductor 60, control fingers 61 and 62 which are bridged by a contact segment 63 of the master controller, conductor 63ª, control fingers 64 and 65, which are bridged by contact segment 66 of the master reverser, conductor 67, contact member 68 of the reversing switch RS, the forward coil $f'$ thereof, conductor 69, interlock LS2—out, and conductors 70 and 74 to the negative terminal of the battery B.

Another circuit is then established from an energized contact segment 71 of the master controller, through control finger 72, conductor 73, the actuating coil of the switch LS2 and conductor 74 to the negative battery terminal. A third circuit comprises contact segment 75, control finger 76, conductor 77 and the actuating coil of the switch M1. Similarly, contact segments 78, 79, 80 and 81 of the master controller engage corresponding control fingers 82, 83, 84 and 85, from which points circuit is completed through the actuating coils of the switches G1, JR1, JR2 and S2, respectively.

Another circuit is established from an energized contact segment 86, through control finger 87, conductor 88 and the actuating coil of the switch RX A further circuit is completed from conductor 88, through conductor 88ª, interlock PK off, conductor 88ᵇ, and the actuating coil of the switch SR4. The switches RX and SR4 thus remain closed throughout acceleration. The motors are thus connected in series relation, with all of the accelerating resistors included in circuit and the battery B being also connected in the main motor circuit in such a direction as to be charged by the motor current. The main circuit connections at this time are simply illustrated in Fig. 10.

If the master controller is moved to its position $b$, a circuit is established from contact segment 89, through control finger 90, conductor 91 and the actuating coil of the switch LS1 to the negative conductor 74, thereby effecting the short-circuit of the resistor LR and accomplishing a certain degree of acceleration of the motors.

Upon the actuation of the master controller to its third operative position $c$, a circuit is established from contact segment 92, through control finger 93, conductor 94 and the actuating coils of the switches R1 and RR1. The actuation of the master controller to positions $d$ and $e$, successively effects engagement of contact segment 95 with control finger 97 and contact segment 96 with control finger 98, whereby the sets of switches R2 and RR2 and R3 and RR3 are respectively closed. The various resistors originally included in the main motor circuit are thus gradually short-circuited to further accelerate the motors.

Upon movement of the master controller to its position $f$, a circuit is established from contact segment 99, through control finger 100, conductor 101 and the actuating coil of the switch BR, whereby the resistor SR is shunted across the battery B. The switch G1 is thereupon opened by reason of the disengagement of contact segment 78 and control finger 82. In position $g$ of the master controller, a contact segment 102 engages control finger 103, whence circuit is completed through conductor 104 and the actuating coil of the switch G2. The battery B is thus excluded from the main motor circuit, being first temporarily shunted by the resistor SR, and the resistor then being short-circuited by the switch G2. The motors at this time are connected in full-series relation. The transition of the motors from series to parallel operation involves first the engagement of a contact segment 105 of the master controller with control finger 106, from which point circuit is completed through conductor 107 and the actuating coil of the switch J. Another circuit is simultaneously established from contact segment 109, through control finger 110 and conductor 111 to the actuating coil of the switch S3. The switches LS1, JR1, JR2, BR and G2 and the R1 and RR1—series of resistance switches then open.

In position $h$, a contact segment 112 engages control finger 113, whence circuit is established through conductor 114 and the actuating coil of the switch M2. Another circuit is simultaneously established from contact segment 115, through control 116, conductor 117 and the actuating coil of the switch AR1. The switches J and S2 are concurrently opened by reason of the exclusion of the corresponding contact segments of the master controller from their auxiliary control circuits. The main-circuit connections at this time are diagrammatically illustrated in Fig. 11.

It should be noted that, throughout the previously described series-operation of the motors and during the uninterrupted series-parallel transition just recited, all of the main field windings are maintained upon the negative or ground side of all of the main armatures, and such arrangement is maintained during the parallel accelerating operation of the motors.

The advantages of maintaining the field windings on the ground side of the armatures, such as relatively small cost and space requirements of insulating material and lessened liability to "grounding" troubles, particularly in relatively high-voltage systems, are believed to be well understood, and no further exposition thereof is deemed necessary here.

Upon actuation of the master controller to its position $i$, a contact segment 118 engages the control finger 90, whereby the switch LS1 is closed in a similar manner to that already set forth. Another circuit is simultaneously completed from contact segment 119, through control finger 120, conductor 121 and the actuating coil of the switch AR2. The resistor LR, which is connected in circuit with the motor having the armature A1, is thus short-circuited at approximately the same time as the resistor R'', which is connected in circuit with the motor having the armature A2. Balanced conditions are thus maintained in the two motor circuits. This remark also applies to the gradual short-circuit of the resistors R and R', respectively, as the master controller is moved to its position $j$, $k$ and $l$, to successively energize the coils of the corresponding switches in a similar manner to that already described. Moreover, the battery B which, during parallel operation of the motors, is connected in a common ground conductor, is excluded from circuit as the master controller is moved through position $m$ to its final running position $n$, in the same way as that set forth in connection with series operation.

Assuming the vehicle to be running at or above a predetermined speed that is suitable for regenerative operation, the operation of the auxiliary control system for effecting regeneration may be described as follows: If it is desired to maintain the field-winding circuit in series with the armature in addition to the energization by the battery B, the switch HS remains in the position shown in solid lines in Fig. 8, whereas, to effect separate excitation of the field-magnet windings, the switch HS is actuated to the position shown in dotted lines, as set forth more fully later. With the switch HS in the position shown in the drawing, with the master controller moved to its regenerative position $a'$, and with the master reverser occupying its forward position, a circuit is first established from one terminal of the battery B through conductor 60, control fingers 61 and 122, which are bridged by contact segment 123 of the master controller, conductor 124, control fingers 125 and 126, which are bridged by segment 127, conductor 128, control fingers 129 and 130, which are bridged by contact member 131 of the main reversing switch RS in its forward position, and the reversing coil $r'$ of the reversing switch to the negative conductor A. The electrical relations of the corresponding armatures and field windings of the momentum-driven motors are thus initially reversed, for a well-known purpose, without necessitating the actuation of the master reverser to its reverse position. As soon as the main reversing switch RS occupies its reverse position, a circuit is established from contact member 131, through control finger 132, conductor 133, interlock R3—out, conductors 134 and 134ᵉ, control fingers 135 and 136, which are bridged by contact segment 137 of the master controller, conductors 138 and 77, the actuating coil of the switch M1 and conductor 74 to the negative battery terminal.

Another circuit is concurrently established from contact segment 143 of the master controller, through control finger 144, conductor 145, interlock PK—off to 4, conductor 146, to coöperating contact members D—down of the differential relay switch D, conductor 147, coöperating contact members LA of the limit switch L1, in its lower position, conductor 148, interlock LS2—out, conductor 149 and the actuating coil of the inverted magnet valve to the negative conductor. A further circuit is completed from conductor 147 through the conductor 150 and the actuating coil of the standard magnet valve.

Another circuit is established from conductor 134, through conductors 151 and 151ᵃ, interlocks JR2—out and PK—1 to 5, conductor 152 and the actuating coil of the switch M2, another branch of this circuit including conductor 152ᵃ, interlock PK—1 to 5, and the actuating coil of the switch S1. A further circuit is established from conductor 142ᵃ through conductor 153 and interlock PK—1 to 5, to a junction-point 153ᵃ, from which point one circuit is completed through the actuating coil of the switch G1, a second circuit through interlock PK—1 to 5 and the actuating coil of the switch JR1, a third circuit through conductor 153ᵇ, interlock PK—1 to 5, the actuating coil of the switch BR, a fourth circuit through conductor 153ᶜ, interlock PK—1 to 5 and the actuating coil of the switch G2, and a fifth circuit through conductor 153ᵈ, interlock PK—1 to 5 and the actuating coil of the switch S2.

Both valve magnets of the apparatus PKC being energized in the above-described manner, the drum 49 will be actuated from its off position through its successive operative positions to a point where the voltage generated by the momentum-driven armatures of the motors, which voltage is gradually increased as the strength of the field winding is increased by the gradual short-circuit of the field-regulating resistor FR, exceeds the supply-circuit voltage by a predetermined amount, whereupon the actuating coil 47 of the differential relay switch D overcomes the opposing action of the coil 45, and the differential relay switch D is actuated to its up position. Thereupon a circuit is established from conductor 151, through conductor 154, coöperating contact members D—up of the differential relay switch D, conductor 155 and the actuating coil of the switch LS2, another circuit being completed from conductor 155, through interlocks PK—1 to 5 and JR2—out to conductor 91 and the actuating coil of the switch LS1.

The motors are thus connected to the supply-circuit for regenerative operation, the armature A1 and the resistor R being disposed in parallel relation with the resistor R' and the armature A2, the field-magnet windings F2 and F1 and the field-regulating resistor FR being connected in series-circuit relation with the parallel connected armatures, and the battery B being connected in parallel relation with the field-magnet windings and the field-regulating resistor. The main circuit connections are diagrammatically shown in Fig. 12.

As soon as the switch LS2 has closed, an interlock LS2—in bridges the coöperating contact members D—up to insure the maintenance of the energizing circuit of the switches LS2 and LS1.

From the time of initial regenerative connection of the motors until they are again disconnected from the supply circuit, as set forth later, the actuating coil of the switch RX is intermittently energized and deënergized in accordance with the movements of the limit-switch contact members LB, thereby inserting the resistor RX' in circuit when the regenerative current attains a relatively high value and short-circuiting the resistor when the current decreases to a predetermined lower value, in the manner already explained.

As soon as the differential relay switch D is raised, the magnet circuits of the inverted and standard valves of the apparatus PKC are interrupted at the coöperating contact members D—down and the drum 49 is thus momentarily returned toward its off position to insert a predetermined amount of resistance in the motor circuit at the instant of connection to the supply circuit, to prevent an undesirable current peak, particularly through the battery. The circuit of the standard magnet is again energized, however, as soon as the switch LS1 is closed, by reason of the interlock LS1—in bridging the gap between the conductors 146 and 147. The apparatus PKC is thus held in some suitable operative position and does not move forward again until all of the resistor short-circuiting switches have been closed, in the manner about to be described.

It should be noted that, in some cases, the automatic insertion of the resistor RX' at the instant of initial regeneration may be sufficient to prevent the current peak referred to, and, in such cases, the backward movement of the apparatus PKC may be dispensed with. Upon closure of the switch LS2, a circuit is established from conductor 148, through interlock LS2—in conductor 156, interlock JR2—out, interlock 157 of the switch R1 and the actuating coils of the switches R1 and RR1.

The closure of the switch R1 effects the engagement of the interlock 158 with control fingers 158ᵃ of the switch R1, whence circuit is completed through interlock 159 of the switch R2 to effect the energization of the actuating coils of the switches R2 and RR2. The switches R3 and RR3 are subsequently closed in a similar manner, the automatic progressive closure of the various resistor short-circuiting switches being effected in accordance with the position of the limit switch L1, in a manner well known in the art. The maintenance of the excitation of the several actuating coils, after the corresponding switches have been closed, is effected by a holding-circuit comprising conductors 157ᵃ, interlock JR2—out, and the positive battery conductor 60.

The closure of the switch R3 completes a circuit from interlock 160 thereof, through conductor 161, interlock LS2—in, conductor 149 and the inverted valve magnet. The standard magnet being already energized, as hereinbefore described, the apparatus PKC is thus gradually actuated toward its final operative position PK5.

The next operation in the system comprises the changing-over of the motor armature from a parallel to a series-circuit relation to permit regeneration to a relatively low speed of the driven vehicle. As soon as the apparatus PKC reaches its position 5, a circuit is established from conductor 145, through conductor 164, interlocks PK—1 to 5 and PK—5, conductor 165 and the actuating coil of the switch JR2. The switch JR2 is closed with the resistor R4 in circuit to prevent an undesirable rush of current. Interlocks JR2—in thereupon bridge the interlocks PK—5 and PK—off, respectively, to insure the permanent closure of the switch JR2, and of the switch SR4 a short time thereafter to exclude the resistor R4.

In addition, when the apparatus PKC attains the position 5, the circuit between conductor 154 and 146 is interrupted by reason of the exclusion therefrom of the interlock PK—off to 4, and the holding circuit for the R1 and RR1 sets of switches is interrupted by the exclusion of the interlock JR2—out from the holding circuit. The switches LS1, M2, S1 and the R1 and RR1 sets of switches are thereupon opened, as indicated in position g' of the sequence chart of Fig. 7 and as shown diagrammatically in Fig. 13. The circuits of the inverted and standard magnets of the apparatus PKC are also interrupted at the interlock PK—off to 4, whereby the drum 49 returns toward its off position to render a predetermined amount of the field-regulating resistor FR active. The arrangement of parts is such that the closure of the switch JR2 and the consequent bridging of the gap between conductors 145 and 146 by interlock JR2—in occurs at a time when the drum 49 has returned, preferably, as far as its initial operative position, but in no case will the drum have sufficient time to return to its off position and thereby open the field-winding circuit.

Thus, the field windings are maintained on the negative or ground side of the armatures during the above-mentioned uninterrupted parallel-series regenerative transition, and, in fact, throughout regenerative operation, for the reasons previously set forth in connection with series-parallel accelerating operation.

When the conductors 145 and 146 have been connected by the interlock JR2—in, a circuit is completed from conductor 146, through interlock JR2—in, conductor 147, coöperating contact members LA of the limit switch L1, provided the switch occupies its lower position, conductor 148, interlock LS2—in, conductor 156, interlocks S1—out and JR2—in, conductor 166, interlock 157 of the switch R1 and thence, through the various actuating coils of the resistor short-circuiting switches in automatic progression, in a manner already described. In the holding-circuit for these coils, the series-connected interlocks LS1—out and LS2—in take the place of the interlock JR2—out.

The closure of the switch R3 again energizes the inverted valve magnet through conductors 161 and 149 to effect automatic operation of the apparatus PKC toward its final position 5 in accordance with the actuation of the limit switch L, that is, in accordance with the regenerated current, to effect, in conjunction with the resistor RX', the regeneration of a substantially constant current to the supply circuit.

When the vehicle speed has attained a predetermined relatively low value, or when the difference in voltage between the armature electromotive force and that of the supply circuit decreases to a predetermined value, the limit switch L2, which bridges the gap between conductors 153 and 154 and forms the only connections therebetween when the R3—out interlock is excluded from circuit by the closure of the R3 switch, drops to its lower position, thereby deënergizing the switches LS1 and LS2 and the various other switches whose actuation is dependent upon the energization of conductor 134.

The motors are thus disconnected from the supply circuit, and an actuation of the master controller to its off position will effect the opening of the remaining switches and, likewise, the deënergization of the inverted and standard magnet valves, whereby the apparatus PKC is also returned to its off position. If desired, the opening of the limit switch L2 may be adapted to automatically effect the actuation of the pneumatic or other brakes of the vehicle, as set forth in my co-pending application, Serial No. 724,068, filed October 5, 1912.

In case it is desired to supply separate excitation to the field-magnet windings of the momentum-driven motors, such operation may readily be effected by actuating the switch HS to the position shown in dotted lines in Fig. 8, thereby connecting the negative side of the armature A2 directly to ground. The operation of the automatic control system in this case is precisely the same as that already described, while the main-circuit connections for parallel relation and series relation, respectively, of the motor armatures are shown in Figs. 14 and 15, which respectively correspond to Figs. 12 and 13.

I do not wish to be restricted to the specific circuit connections or the arrangement of parts herein set forth, as various modifications thereof may be made within the spirit and scope of my invention; and I desire, therefore, that only such limitations shall be imposed as are indicated in the appended claims.

I claim as my invention:

1. In a system of control, the combination with a supply circuit, an electric motor having an armature and a field magnet winding, of an energy accumulator disposed in series-circuit relation with said motor at starting and adapted to be charged by the motor current, and subsequently excluded from circuit to cause acceleration of the motor, a variable resistor, means for regeneratively connecting the motor to said supply circuit, with said accumulator connected in parallel with the field winding and said resistor when the armature voltage exceeds the supply-circuit voltage by a predetermined value, and means for varying said resistor as the motor speed decreases to maintain a substantially constant regenerated current.

2. In a system of control, the combination with a supply circuit, and a plurality of dynamo-electric machines, of a plurality of accelerating resistors and an energy accumulator initially connected in series-circuit relation with said machines, means for subsequently excluding said resistors and said accumulator successively from circuit, means for effecting a transition to parallel connection of said machines with said resistors and said accumulator again connected in circuit, means for effecting exclusion of said resistors and said accumulator from circuit as before, and means for connecting said accumulator through one of said resistors across the machine field windings to effect regeneration, the accumulator being directly connected to the negative side of the supply circuit whenever included in the motor circuit.

In testimony whereof, I have hereunto subscribed my name this 15th day of April 1915.

NORMAN W. STORER.